United States Patent [19]

Gratzer et al.

[11] 4,449,680

[45] May 22, 1984

[54] AERODYNAMICALLY CONTOURED, LOW DRAG WING ENGINE AND ENGINE NACELLE COMBINATION

[75] Inventors: Louis B. Gratzer, Seattle; Walter B. Gillette, Issaquah, both of Wash.

[73] Assignee: The Boeing Company, Seattle, Wash.

[21] Appl. No.: 218,737

[22] Filed: Dec. 22, 1980

Related U.S. Application Data

[63] Continuation of Ser. No. 000,697, Jan. 3, 1979, abandoned.

[51] Int. Cl.$^3$ .................. B64C 1/38; B64D 29/02
[52] U.S. Cl. .................... 244/130; 244/54; 244/55
[58] Field of Search ............. 244/54, 55, 15, 53 R, 244/130

[56] References Cited

U.S. PATENT DOCUMENTS

| | | |
|---|---|---|
| 3,018,983 | 1/1962 | Davidson ............... 244/55 |
| 3,199,813 | 8/1965 | Roper .................. 244/130 |
| 3,799,476 | 3/1974 | Bouiller et al. ........ 244/54 |
| 3,952,973 | 4/1976 | James .................. 244/54 |
| 4,311,289 | 1/1982 | Finch .................. 244/130 |

OTHER PUBLICATIONS

Goodmanson et al., "Recent Advances ... For Transport Aircraft", AIAA 9th Annual Meeting, Jan. 8–10, 1973, p. 11.

Wells et al., "Wind Tunnel ... Investigation of Over-14 The-Wing Propulsion/Air Frame Interferences for a Shorthaul Aircraft ... ", NASA Contractor Report CR-2905, Sep. 1977, p. 24.

Primary Examiner—Charles E. Frankfort
Attorney, Agent, or Firm—Hughes, Barnard & Cassidy

[57] ABSTRACT

A nacelle mounted by a pylon above and forwardly of a wing. The wing has a critical zone, which includes an area in the airstream flow about the wing where either of the following conditions occur:

1. The local pressure coefficient in the airstream has an absolute magnitude greater than 0.05,
2. The airstream flow about the airfoil is supersonic.

The nacelle and pylon have a critical surface region which is a lower side surface portion of the nacelle and the contiguous pylon surface adjacent to a forwardly swept portion of the wing. The critical contour area of the nacelle surface is that portion of the critical surface region that is within the critical zone. The critical contour area of the nacelle and pylon are shaped to be in alignment with a plurality of airfoil stream lines that are immediately adjacent the critical contour area. Other surface portions of the nacelle are out of alignment with adjacent stream lines and correspond more closely to the engine structure contour.

15 Claims, 9 Drawing Figures

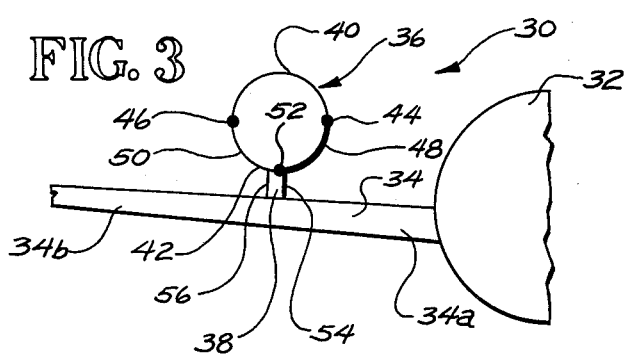
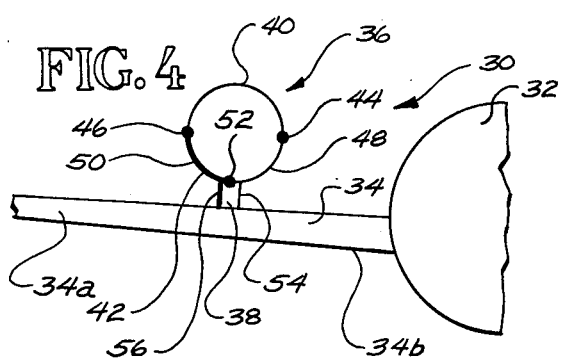
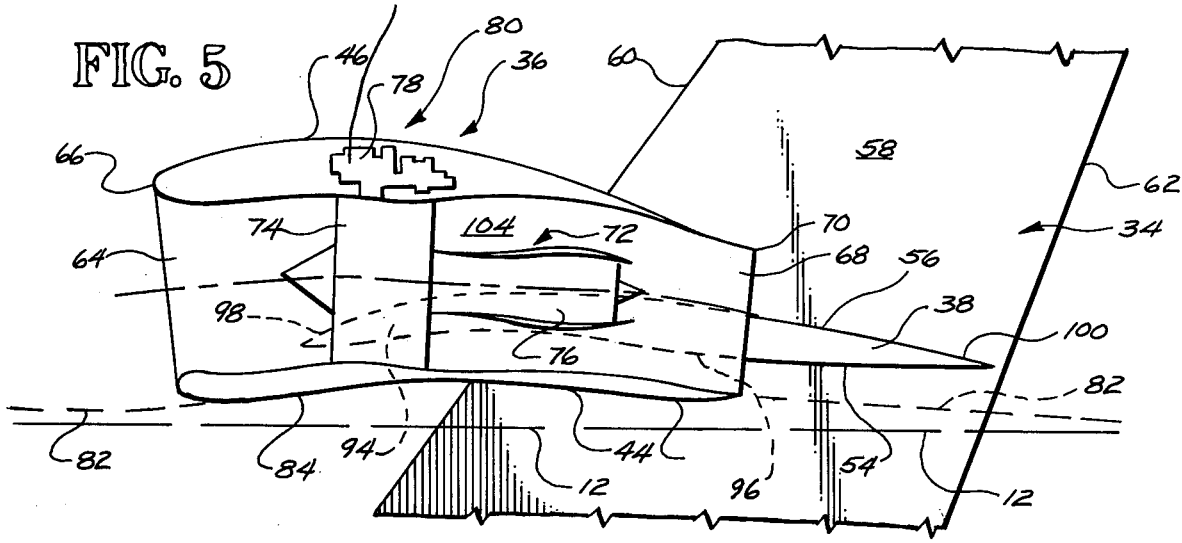
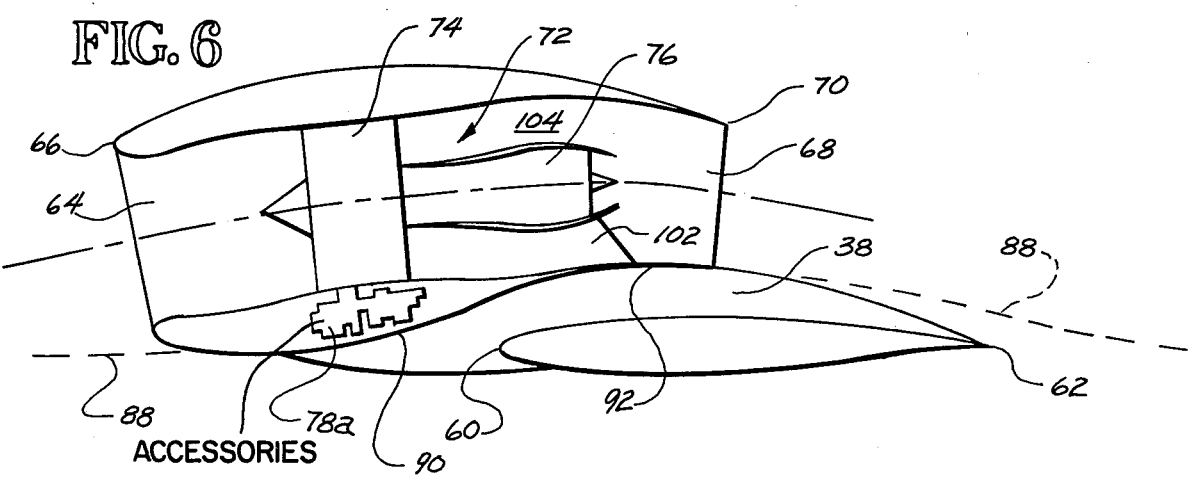

AERODYNAMICALLY CONTOURED, LOW DRAG WING ENGINE AND ENGINE NACELLE COMBINATION

CROSS REFERENCE TO RELATED APPLICATIONS

This application is a continuation of U.S. patent application Ser. No. 000,697, filed Jan. 3, 1979, and now abandoned. Further, this application is related to three other U.S. patent applications, which were filed concurrently herewith and are by the same inventors as the present application, these related applications being Ser. Nos. 218,847, 218,829 and 218,738.

BACKGROUND OF THE INVENTION

The present invention relates to an airfoil, engine and engine nacelle combination, where the aerodynamic contours are such as to properly accommodate the engine and approach minimum drag.

It has long been known that aerodynamic interference drag can be alleviated by contouring an object so that its surface lies as nearly as possible along streamlines generated by adjacent aerodynamic objects. With regard to a nacelle mounted adjacent to a wing, an idealized configuration would be such that the nacelle is "hidden" aerodynamically from the nearby wing by shaping the nacelle so that it lies entirely along streamlines generated by the wing. In this case, the nacelle would be "invisible" to the wing and thus no interference would occur. This is a well understood concept of aerodynamics and has been disclosed in various publications (e.g. (a) Report No. NASA CR-2905, dated September 1977, entitled "Wind Tunnel and Analytical Investigation of Over-the-wing Propulsion/Air Frame Interference For A Short Haul Aircraft at Mach Numbers from 0.6 to 0.78.)" (b) AIAA Paper Number 73-9, entitled "Recent Advances in Aerodynamics for Transport Aircraft", by L. T. Goodmanson and L. B. Gratzer.

In order to meet this requirement, the nacelle would lie along a stream tube of the air passing adjacent the wing, and the volume of the nacelle would be determined entirely by that available within the stream tube. If the nacelle were mounted to a pylon, then the pylon would have to be infinitely thin, so as to lie entirely on a stream sheet. Or, if the pylon had thickness, it would have to extend from infinity upstream to infinity down stream, being between two stream sheets of the air flowing around the wing.

With regard to a nacelle containing an engine this ideal nacelle and pylon are not practical for a number of reasons. Among the more important reasons are the following. First, the nacelle cross-sectional area at its main control portion is substantially larger than at its inlet or outlet area, because of the turbine machinery, the nacelle structure and accessory gear boxes. Also, the inlet stream tube tends to expand as it nears the inlet. Another consideration is that the engine exhaust tends to change shape after it leaves the exit nozzle and generally has a different area than the stream tube that it is replacing. Where there is a pylon, the pylon must have thickness, which in turn requires a leading and trailing edge which are by necessity near the wing.

Thus in actual practice a nacelle and pylon must depart in some manner from the ideal geometry which would produce no interference with the adjacent airstream. It is an object of this invention to provide a wing, engine, and engine nacelle combination arranged in a manner that each performs its intended function and with the overall combination being arranged in such a manner as to minimize drag.

In a search of the patent literature, there was disclosed a U.S. Pat. No. 3,199,813, Roper, which relates to contouring a pod mounted to an outboard end of a swept wing. That portion of the pod which is either directly above or directly below the wing is contoured so as to follow the two-dimensional flow patterns of the airstream flowing directly over or directly under the wing. While the Roper patent does represent an advance in the state of the art at that time, to the best knowledge of the applicants, the teaching in Roper is not adequate to provide a full understanding of the principles necessary to arrive at the present invention.

The other patents noted in the patentability search are representative of various aerodynamic shapes. A review of these patents indicate that to the best knowledge of the applicants herein these are not particularly relevant to the present invention. However, these are disclosed herein to ensure that the applicants are fully complying with their duty of disclosing to the Patent Office all prior art of possible relevance.

U.S. Pat. No. 1,813,645, Townsend
U.S. Pat. No. 2,090,775, Wright
U.S. Pat. No. 2,207,242, Seversky
U.S. Pat. No. 2,576,981, Vogt
U.S. Pat. No. 2,649,266, Darrieus
U.S. Pat. No. 2,874,922, Whitcomb
U.S. Pat. No. 2,898,059, Whitcomb
U.S. Pat. No. 2,927,749, Brownell
U.S. Pat. No. 2,984,439, Fletcher
U.S. Pat. No. 3,129,906, Peterson
U.S. Pat. No. 3,229,933, Kutney
U.S. Pat. No. 3,237,981, Wotton
U.S. Pat. No. 3,369,775, Rethorst
U.S. Pat. No. 3,448,945, Ascani, Jr.
U.S. Pat. No. 3,455,523, Hertel
U.S. Pat. No. 3,476,336, Hertel
U.S. Pat. No. 3,519,227, Brooks
U.S. Pat. No. 3,533,237, Rabone et al
U.S. Pat. No. 3,606,213, Lubimov
U.S. Pat. No. 3,727,862, Kaufhold et al
U.S. Pat. No. 3,776,489, Wen et al
U.S. Pat. No. 3,806,067, Kutney
U.S. Pat. No. 3,960,345, Lippert, Jr.
U.S. Pat. No. 3,968,946, Cole

SUMMARY OF THE INVENTION

The present invention is a combination of an airfoil, engine and engine nacelle designed for an aircraft having a longitudinal axis and designed for flight at a predetermined design speed through a main airstream having a main flow direction.

The combination comprises an airfoil having a leading edge, a trailing edge, and an upper aerodynamic surface, said airfoil having a predetermined sweep angle of at least 10° and having an outboard end and an inboard end. There is a nacelle mounted near the airfoil at a location spaced above and forwardly of the airfoil. The nacelle has an upper nacelle surface and a lower nacelle surface, with the lower nacelle surface comprising an inboard lower nacelle surface portion extending from a lower center line of the lower surface to an inboard sideline where the lower nacelle surface joins to the upper nacelle surface. It also has an outboard lower nacelle surface portion extending from the lower center line to an outboard side line where the lower nacelle surface joins to the upper nacelle surface. The lower nacelle surface is spaced upwardly and forwardly from the upper aerodynamic surface, with the lower nacelle surface having a rear end positioned rearwardly of the leading edge and a forward end positioned forwardly of the leading edge. An engine is mounted in the nacelle.

The airfoil is characterized that in a situation where the airfoil would be passing in flight through the airstream at design speed, without the nacelle being near the airfoil, the airfoil creates in the airstream an airstream flow pattern having a plurality of stream lines which approach the leading edge and pass over the airfoil. The airfoil creates in the airstream flow pattern a critical zone. This zone includes a general area in the airstream flow proximate said airfoil, where either of the following conditions occur:

1. a local pressure coefficient in the airstream flow has an absolute magnitude greater than 0.05,
2. the airstream flow about the airfoil is supersonic.

The nacelle has a critical surface region which comprises the lower nacelle surface portion adjacent an airfoil portion that sweeps laterally and forwardly from the nacelle. The nacelle has a critical contour area which comprises an area where any portion of the critical surface region is within the critical zone.

The critical contour area of the nacelle is in substantial contour alignment with the streamlines immediately adjacent the critical contour area. The critical contour area has a forward portion forward of the leading edge and sloping rearwardly in an upward and lateral direction slanted from the main flow direction in a direction of rearward sweep of the airfoil. The critical contour area has a rear portion rearward of the leading edge sloping rearwardly in a lateral direction from the main flow direction oppositely to the direction of rearward sweep of the airfoil.

The upper nacelle surface and the lower nacelle surface portion which is not included in the critical contour area is collectively considered as a non-critical contour area. The non-critical contour area has at least a substantial portion thereof shaped to conform to configuration requirements of the engine, with at least part of the substantial portion of the non-critical contour area departing from substantial contour alignment with adjacent streamlines.

In the preferred form, the nacelle has an inlet end, an outlet end and a main body portion intermediate the inlet and outlet ends. The outlet end has a cross sectional area smaller than that of the main body portion, and at least a portion of the non-critical contour area is arranged to slope from said main body portion rearwardly to the outlet end on a slant toward a longitudinal center line of the nacelle.

In the preferred form, the critical contour area is aligned within a tolerance to satisfy the following formula:

$$\frac{|h|}{\sqrt{\frac{A_\pi}{\pi}}} < \text{the alignment tolerance value}$$

"h" = the distance between point of reference and most adjacent point.

$A_\pi$ = cross sectional area of nacelle at most adjacent point where the following definitions apply:
a. "point of reference" is any point on the stream sheet in the critical contour area,
b. "most adjacent point" is any point on the nacelle nearest to the point of reference,
c. $A_\pi$ is a frontal area of the nacelle measured in a plane which contains the most adjacent point and is perpendicular to free stream direction.

The broader range of the tolerance value is a value no greater than about 0.2. A more preferred range is no greater than about 0.15, with the most preferred range being a tolerance value of no greater than about 0.1.

The curvature of the critical contour area should be within a tolerance to satisfy the following formula:

$$\left(\frac{M}{M_\infty}\right)^2 \left(\sqrt{\frac{A_\pi}{\pi}}\right) \left|\frac{1}{R_{S.S.}} - \frac{1}{R_N}\right| \text{contour tolerance value}$$

where the following definitions apply:
M = Mach number on the stream sheet at the point of reference.
$M_{oo}$ = free stream Mach number at infinity.
$R_{S.S.}$ = radius of curvature of stream sheet at point of reference.
$R_N$ = radius of curvature of nacelle at most adjacent point.

where the radius of curvature of either the stream sheet at the point of reference or the nacelle at the most adjacent point is measured in a plane which contains the surface normal at the point and the local velocity vector at the point. The broader limit of the contour value is 0.15, an intermediate value 0.1, and the preferred value 0.05.

In the preferred form, the engine comprises a turbo fan engine having a fan section and a core engine. The engine has engine accessories located adjacent the fan section within the nacelle at a location adjacent to a part of the main body portion of the nacelle at the non-critical contour area. An alternate location of the engine accessories is adjacent the forward portion of the critical contour area of the nacelle.

Desirably, the nacelle is mounted to a pylon, with the pylon having an inboard surface and an outboard surface. The surface of the pylon which is adjacent the critical contour area of the nacelle then becomes a pylon critical contour area. The pylon critical contour area is shaped to conform to streamlines immediately adjacent to the pylon critical contour area. The alignment tolerances and curvature tolerances given above with reference to the nacelle critical contour area also apply to the pylon critical contour area.

Other features will becomes apparent from the following detailed description.

BRIEF DESCRIPTION OF THE DRAWINGS

FIG. 3 is a semi-schematic view showing an aircraft with a rearwardly swept wing, having a pylon-mounted engine thereon, and indicating the "critical region" of the nacelle and pylon;

FIG. 4 is a semi-schematic drawing of an airplane having a forward swept wing with a pylon-mounted engine nacelle, illustrating the "critical region" for the nacelle and pylon;

FIG. 5 is a top plan view of a pylon-mounted engine nacelle, with the top portions thereof broken away to display the engine therein, mounted to a rearwardly swept wing and incorporatiog teachings of the present invention;

FIG. 6 is a side elevational view of the nacelle of FIG. 5, with an inboard side portion thereof broken away;

DETAILED DESCRIPTION OF THE PREFERRED EMBODIMENTS

It is believed that a clearer understanding of the present invention will be achieved by presenting first the analytical considerations which are basic to the present invention, and then describing the apparatus of the present invention.

As a first step in defining the apparatus of the present invention, there is a determination of what is called the "critical zone" of the airfoil to which a nacelle is mounted. When an airfoil passes through the air, it generates streamlines in the main stream flow which bend around the airfoil. The result of this is that the air that flows around the airfoil experiences changes in both pressure and velocity.

The critical zone is that area which includes any point around the airfoil where either of the following conditions occur:

1. the local pressure coefficient in the air stream flow has an absolute magnitude greater than 0.05.
2. the local airstream flow around the airfoil is supersonic.

Figure 1:
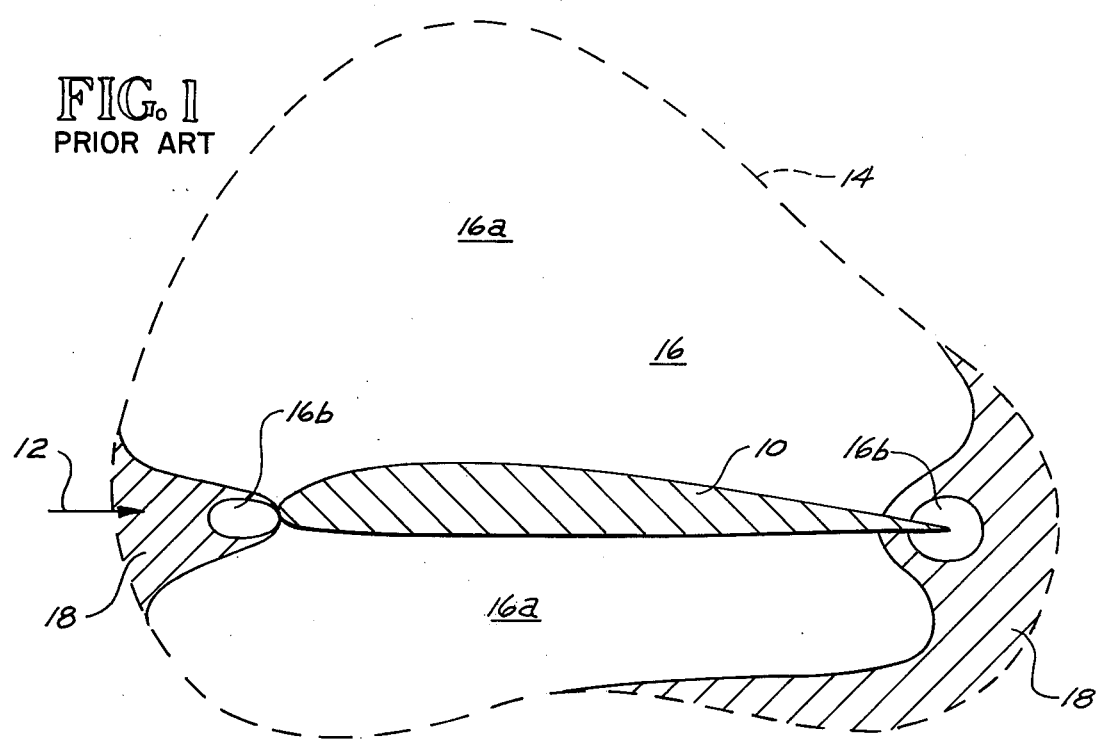
FIG. 1 is a schematic drawing of an airfoil outlining a typical "critical zone" of the airfoil, which can be related to a pressure coefficient characterizing its outer boundary.

Reference is made to FIG. 1 which shows in chordwise section a typical airfoil 10 moving relative to a main stream of air indicated by the arrow 12, at a Mach number of about 0.8. (As used herein, the term "airfoil" is used in its broader sense to denote a wing-like structure that generates lift.) There is a broken line 14 surrounding the airfoil 10, and this line 14 encloses a general area 16 where the absolute magnitude of the local pressure coefficient exceeds 0.05. As used herein, the term "pressure coefficient" can be defined according to the following formula:

$$Cp = \frac{P - P_\infty}{q_\infty}$$

P = static pressure at any location
$P_\infty$ = static pressure in the aistream at infinity
$q_\infty$ = dynamic pressure in the airstream at infinity Within the larger area 16, there are "imbedded zones" which are indentations within the zone 16, where the absolute magnitude of Cp is less than 0.05, but where the air is experiencing a relatively rapid change in velocity. These imbedded zones are indicated at 18 in FIG. 1 as shown and shaded. Within the broader definition of the "critical zone", it is intended that the critical zone should include these imbedded regions 18 which are within the zone 16. The areas within the zone 16 which have a Cp lower than minus 0.05 are indicated at 16a. and those which have a Cp higher than plus 0.05 are indicated at 16b.

Figure 2:
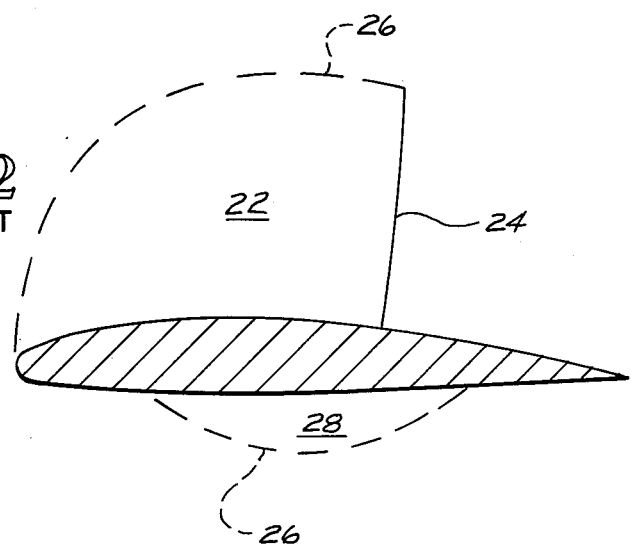
FIG. 2 is a second schematic drawing of an airfoil showing a typical portion of the "critical zone" as it relates to areas of supersonic flow over an airfoil.

With regard to the second criterion to define the critical zone (i.e. where the flow above the airfoil is supersonic), reference is made to FIG. 2. There is an upper broken line 20, enclosing an area 22 where the flow above the airfoil 10 becomes supersonic. This area 22 is defined at its rear portion by a line 24 representing a shock wave where the flow over the airfoil turns subsonic. There is a second broken line 26, defining an area 28 below the airfoil 10, where the flow is also supersonic.

The definition of the two criterion for the critical zone can be achieved in any number of ways well known to the aerodynamicist. For example, these could be obtained experimentally by testing the airfoil in a wind tunnel. Further, there are analytical procedures by which these perimeters can be determined.

The second consideration in defining the apparatus in the present invention is to define a "critical surface region" of the nacelle which is to be pylon-mounted to the wing of the aircraft. With reference to FIG. 3, there is shown an aircraft 30 having a fuselage 32, a rearwardly swept wing 34, a longitudinally aligned nacelle 36, and a pylon 38 mounting the nacelle 36 above the wing 34.

The nacelle 36 can be considered as having an upper surface 40 and a lower surface 42, with these surfaces 40 and 42 meeting at an inboard side line 44 and an outboard side line 46. The lower surface 42 can in turn be considered as having an inboard lower surface portion 48 and an outboard lower surface portion 50. The inboard lower surface portion 48 can be considered as being bounded by the sideline 44 and a lower surface center line 52. The outboard lower surface portion 50 can be considered as being boarded by the outboard side line 46 and the lower center surface line 52.

With regard to the pylon 38, it also is longitudinally aligned, and has an inboard surface 54 and an outboard surface 56.

With wing 34 being swept rearwardly, with respect to the location of the nacelle 36 and pylon 38, the wing 34 can be considered as having two portions, namely: (a) a forwardly swept portion 34a which extends laterally and forwardly from the nacelle 36 and pylon 38, (b) a rearwardly swept portion 34b extending laterally and rearwardly from the location of the nacelle 36 and pylon 38.

The "critical surface region" of the nacelle 36 is defined as the lower side surface portion which is adjacent the forwardly swept portion of the wing. In the configuration of FIG. 3, where the total wing 34 is swept rearwardly from the fuselage 32, the critical surface region becomes the lower side surface portion 48.

With regard to the pylon 38, the critical surface region is that surface of the pylon which is adjacent the forward swept portion of the wing. Thus, in the configuration of FIG. 3, the critical surface region of the pylon 38 is the inboard surface 54 which is adjacent the forward swept wing portion 34a.

To identify the "critical surface region" in the situation where the nacelle is mounted above the wing and the wing has a forward sweep, reference is now made to FIG. 4, which shows the nacelle mounted above a forward swept wing. The same numerical designations that were applied to the airplane of FIG. 3 are applied to the airplane of FIG. 4 with one exception. With the wing being forward swept instead of swept rearwardly (as in FIG. 3), the portion of the wing 34 which sweeps forwardly from the location of the nacelle 36 and pylon 38 is the outboard wing section, so this is designated 34a. The inboard wing section sweeps rearwardly from the nacelle 36 and pylon 38, so this is designated 34b.

To identify the critical surface region of the pylon and nacelle of the forward swept wing of FIG. 4, the same analysis is applied as that relative to FIG. 3, in that the critical region of the nacelle 36 is the lower side surface portion adjacent the forward swept wing portion (which in this instance is the lower outside surface portion 50). The critical surface region of the pylon 38 is that surface adjacent the forward wing portion 34a, which in this instance is the outboard pylon surface 56.

With the "critical zone" and "critical surface region" now being defined, we now proceed to a definition of the "critical contour area". The critical contour area can be defined as that portion of the "critical surface region" which lies within the "critical zone".

The present invention is predicated upon the premise that in contouring the nacelle 36 and pylon 38 the critical contour area of the nacelle 36 and pylon 38 should be shaped in accordance with the streamlines generated by the airfoil 34, while the other surface portions of the nacelle 36 and pylon 38 should be shaped to correspond to the functional and structural requirements of the engine contained in the nacelle 36. To apply this directly to the structure of the present invention, reference is now made to FIGS. 5 and 6.

In FIG. 5, there is shown in top plane view the wing 34 having an upper aerodynamic surface 58, a leading edge 60, and a trailing edge 62. The nacelle 36 is designed for a long duct fan jet engine having a mixed flow nozzle configuration. There is an inlet 64 defined by the leading edge 66 of the nacelle 36, and an exhaust nozzle 68 defined by the trailing edge 70 of the nacelle 36. The engine itself, designated 72, comprises a forward fan section 74, a core engine 76, and engine accessories 78. (The engine accessories are such things as hydraulic pumps, alternators, etc. that are driven from the engine 72.) In FIG. 5, the engine accessories are shown at 78 as being located adjacent the fan section 74 on the outboard side thereof. FIG. 6 shows an alternate configuration where these accessories 78a are located adjacent to and beneath the fan section 74.

To a large extent, the general configuration of the nacelle 36 must be dictated by the engine requirements. Considering first the engine 72 itself, the core engine 76 and fan 74 must be sized to produce adequate thrust for the aircraft. This in turn dictates to a large extent the total cross-sectional area of the main central portion of the engine, indicated generally at 80. Also, if the accessories 78 are to be positioned adjacent the fan section 74 (which is the most convenient location if the accessories 78 are to be driven directly from the fan section 74), this dictates a somewhat larger cross-sectional area at the main central portion 80.

The cross-sectional area of the inlet 64 is dictated mainly by the air requirements of the engine 72, and of course the inlet leading edge 66 must be contoured within reasonably narrow design limits to minimize drag and flow losses in the airstream flowing into and adjacent the inlet 64. Finally, the area of the nozzle opening 68 will be sized to maximize thrust generated by the exhaust gases exiting from the nozzle 68, and this in turn dictates the configuration of the trailing edge 70, which is relatively sharp to reduce drage that might otherwise be created at the aft end of the nacelle 36.

With most modern turbo fan engines, the overall configuration is such that the cross-sectional area at the trailing edge 70 is smaller than the cross sectional area at the main engine structure 80, and also smaller than the cross-sectional area at the inlet 64. Also, the cross-sectional area at the main engine structure 80 is generally moderately larger than that at the inlet leading edge 66. For this reason, in a conventional design of an engine nacelle, with the nacelle surface symmetrically contoured, the outer surface of the nacelle will generally curve moderately in an expanding configuration from the inlet toward an intermediate portion of the nacelle, and then curve in a contracting configuration toward the exhaust end of the nacelle.

To relate these considerations to the present invention, attention is now directed to the streamlines of the air flowing about a swept airfoil. (For purposes of defining a "swept airfoil" in the present invention, a "swept airfoil" shall be considered an airfoil where the pressure isobars over the upper surface of the airfoil make an angle of 10° or more to a line perpendicular to the main air stream.) As the wing 34 passes through the air, the streamlines which approach the leading edge 60 will bend laterally in a direction corresponding to the sweep of the wing 34. With the wing 34 being swept rearwardly from the fuselage 32, the streamlines approaching the leading edge 60 will thus bend in an outboard direction. Also, the streamlines will diverge upwardly and downwardly, with some of the streamlines passing over the wing upper surface 58, and some passing below the wing 34.

With regard to the streamlines which bend upwardly over the airfoil upper surface 58, as these streamlines cross over the leading edge 60 they generally follow the contour of the upper surface 58. With respect to bending laterally, as the streamlines pass over the leading edge 60, streamlines turn inboard and curve moderately in an inboard direction over the forward portion of the wing surface 58. As these upper streamlines approach the trailing edge 62, they tend to straighten and follow the main stream of the airflow.

In contouring the nacelle 36 and the pylon 38, the "ideal" stream tube of the air flowing around the wing (i.e. those streamlines comprising a tube of a diameter approximately equal to the nacelle and occupying the position of the nacelle, which would be generated by the wing 34 with no aerodynamic interference from other objects) are first located. This can be done in any convenient manner well known to the aerodynamicist. For example, this could be done experimentally in a wind tunnel, or any number of analytical methods could be used.

Then, the "critical contour area" of the nacelle 36 and pylon 38 is shaped to follow the contour of the ideal streamlines passing around the airfoil. After this, the "non-critical contour area" (i.e. the surface areas of the nacelle 36 and pylon 38 other than the "critical contour area") is shaped to satisfy the overall configuration requirements of the nacelle 36 and pylon 38 as dictated by the requirements of the engine 72.

To relate this specifically to the nacelle shown in FIGS. 5 and 6, reference is made to FIG. 5, where there is shown a streamline 82 which passes adjacent the inboard side line 44 of the nacelle 36. (As indicated previously, this side line 44 defines the approximate upper limit of the critical surface region, a substantial portion of which is within the critical contour area.) Thus, the nacelle at the location of the inboard side line 44 is contoured to follow the streamline 82 so that the following configuration occurs. A forward portion 84 of the inboard side line 44 slants in a curve in an outboard direction until it reaches the leading edge 60. At the location of the leading edge 60, the rear portion 86 of the inboard sideline 44 turns inboard and curves to follow the contour of the streamline 82. So that this curve in the streamline 82 can be seen more clearly, the direction of the main stream flow is indicated at 12 in FIG. 5.

Reference is now made to FIG. 6, where there is shown a second streamline 88 which is near to the lower center surface line 52. Since at least a substantial portion of the surface area proximate the line 52 is in the critical contour area, the forward portion of this surface area, indicated at 90, curves upwardly over the leading edge 60 of the wing 34, and a rear portion 92 of this surface area tends to curve in an opposite direction to be aligned more nearly horizontally and thus follow the streamline 88 which likewise is more nearly horizontal over the wing 34.

With regard to the inboard surface 54 of the pylon 38, reference is made to FIG. 5. It can be seen that this surface 54 also follows the contour of the adjacent streamlines, which in turn follow the general pattern of the streamlines 82 and 88. Thus, the forward portion 94 of the pylon surface 54 curves in an outboard direction, while the rear portion 96 of the surface 54 curves from the leading edge 60 in an inboard direction, and then tends to be more nearly aligned to the main streamline at the trailing edge 62 of the airfoil.

Slight deviations from the ideal stream tube are permitted near the nozzle and the trailing edge of the pylon in order to direct the jet exhaust in a direction closely approximating that of the ideal stream tube and to allow closure of the pylon without adversely affecting the flow on the opposite or non-critical side.

To turn our attention now to the non-critical contour area, reference is first made to FIG. 5, where the outboard nacelle sideline 46 is shown in plan view. It can be seen that this line 46 slants from the leading edge 66 of the inlet 64 in an outboard direction to the location of the fan section 74, and then curves in an inboard and rearward direction to terminate at the nozzle trailing edge 70. The nacelle contours only generally conform to the ideal stream tube shape in this area, and greater deviation from ideal stream tube are permitted.

With regard to the upper surface 40 of the nacelle 36 reference is made to FIG. 6, where it can be seen that this surface 40 curves in a contour which expands from the leading edge 66 to the location of the fan section 74, and then curves more toward the center axis of the engine 72 to terminate at the nozzle trailing edge 70.

With regard to the non-critical contour area of the pylon 38 (i.e. the outboard surface 56) from the pylon leading edge 98, this surface 56 curves in an outboard direction rearwardly to the wing leading edge 60, and thence in a curve in a moderate inboard direction to a trailing edge 100 of the pylon 38. Again some deviation, generally larger than in the critical contour area, is permitted near the nozzle and the trailing edge of the pylon.

In the configuration of FIG. 5, the accessories 78 are positioned within the nacelle 36 at the outboard location of the fan casing 74. However, another convenient location for these accessories 78 is indicated at 78a in FIG. 6, where the accessories 78a are positioned in what might be termed the "downward bulge" of the nacelle 36 at the location of the fan section 74.

Also, as indicated in FIG. 6, the core engine 76 has an internal pylon 102 which connects the core engine 76 to the exterior pylon 38. Since this internal pylon 102 lies completely within the nacelle 36, it is contoured to be compatible with the flow in the fan duct 104 and to minimize internal flow losses.

Figure 7:
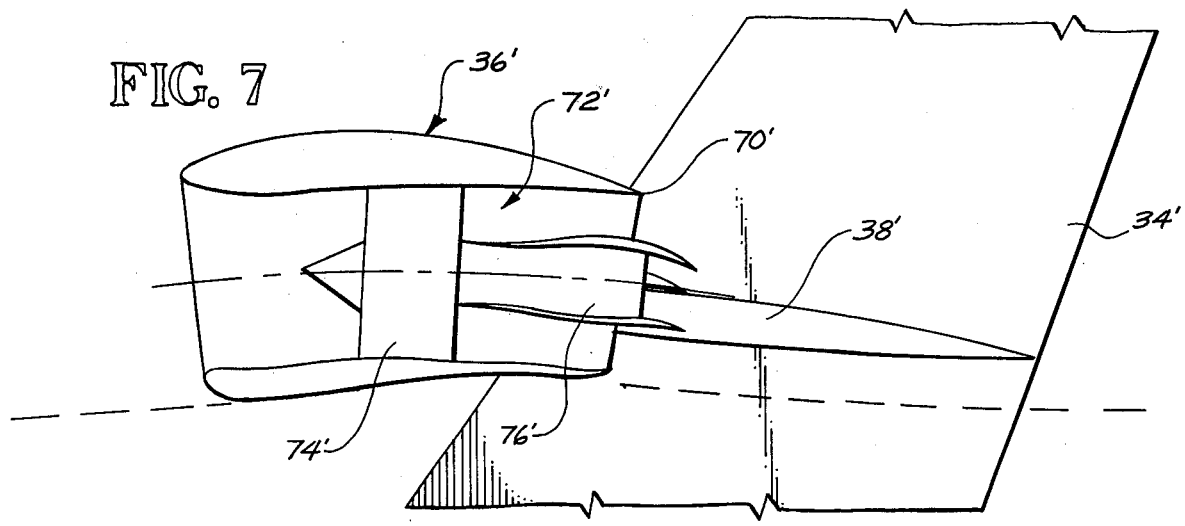
FIG. 7 is a top plan view similar to FIG. 5, but showing the nacelle incorporating the present invention utilized in a three-quarter fan duct engine.
Figure 8:
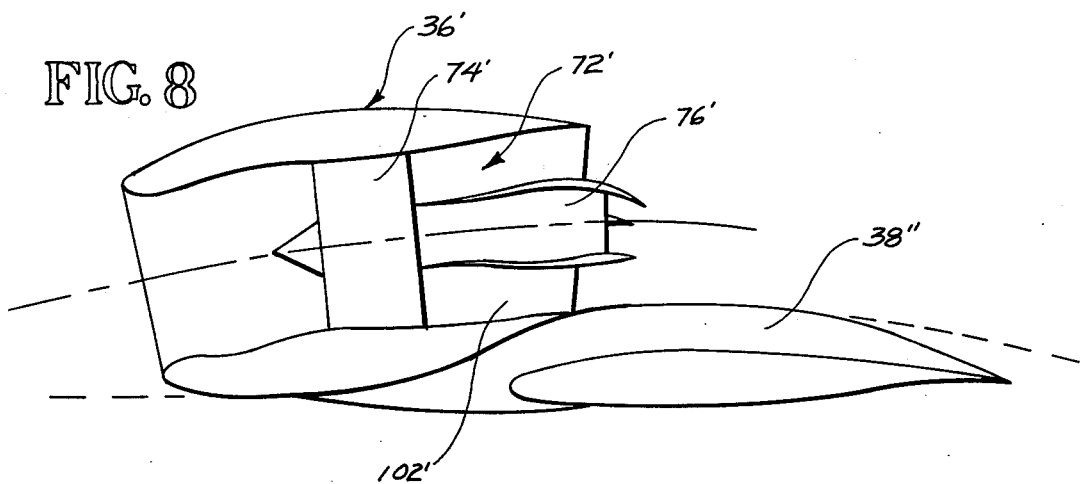
FIG. 8 is a side elevational view similar to FIG. 6, showing the nacelle and engine of FIG. 7.

Reference is now made to FIGS. 7 and 8 which illustrate the present invention incorporated in a three-quarter duct fan jet engine. Since the main components of the engine and nacelle of FIGS. 7 and 8 are substantially similar to those of FIGS. 5 and 6, like numerical designations will be given, with a prime (′) designation distinguishing those of the engine and nacelle of FIGS. 7 and 8.

Thus, there is a nacelle, 36′, mounted by a pylon 38′ to the wing 34′. The engine 72′, with the fan section 74′ and core engine 76′, is substantially similar to the engine 72 of FIGS. 5 and 6. The contours of the nacelle 36′ are substantially similar to the nacelle 36 of FIGS. 5 and 6, except that the nacelle 36′ is made substantially shorter, so that the trailing edge 70′ is positioned at a more forward location. The contours in the critical contour area remain substantially the same as in FIGS. 5 and 6. The surface contours of the pylon 38′ in the non-critical contour areas are altered moderately to fit the shortened configuration of the nacelle 36′. Further, that portion of the internal pylon 102′ which is aft of the nacelle trailing edge 70′ should have its inboard surface contoured to match more closely the adjacent surface portion 54′ of the pylon 38′.

Figure 9:
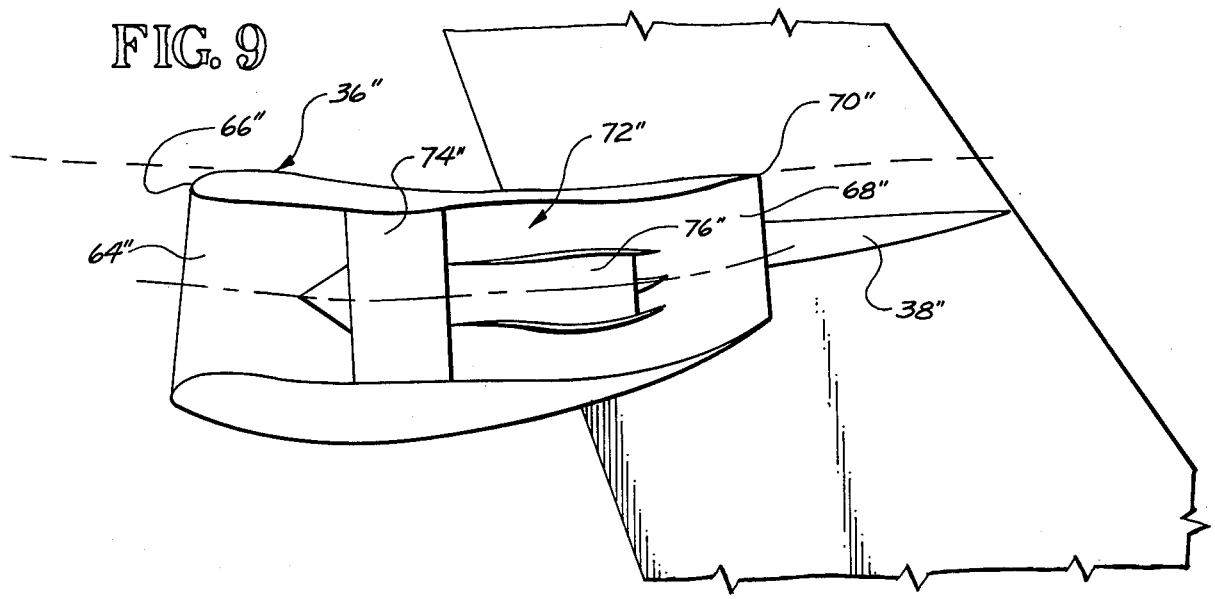
FIG. 9 is a top plan view similar to FIG. 5, but showing an engine and nacelle similar to FIG. 5 being mounted to a forward swept wing.

Reference is now made to FIG. 9 which shows an engine and nacelle, similar to those shown in the embodiment of FIGS. 5 and 6, but mounted to a forward swept wing. The components of the embodiment shown in FIG. 9 which are similar to those shown in FIGS. 5 and 6 will be given numerical designations, with a double prime (″) designation distinguishing those of the embodiment of FIG. 9.

As indicated in FIG. 4, the critical contour areas of the nacelle 36″ and pylon 38″ are now positioned adjacent the outboard portion of the wing 34″. Thus, the same design criteria will be employed in shaping the nacelle 36″ and pylon 38″, except that these will be substantially a mirror image of the nacelle 36 and pylon 38 of the embodiment shown in FIGS. 5 and 6. The reason for this is of course, that the pattern of the streamlines flowing over the forwardly swept wing 34″ tend to be mirror images of the streamlines passing over the rear swept wing of FIGS. 5 and 6. Since the details of this contouring of the nacelle 36′ and pylon 38″ are readily apparent from a review of the description with reference to FIGS. 5 and 6, a detailed description of the embodiment of FIG. 8 will not be given. Rather, the corresponding components will simply be given numerical designations in the showing of FIG. 9.

With regard to the contouring of the nacelle and pylon in the critical contour area, two criteria should be followed. First, there is the tolerance within which the critical contour area should follow the ideal stream sheet. (The ideal "stream sheet" is the sheet defined by the streamlines adjacent the critical contour area determined for the flow about the wing alone.) Second, there is the limitation on the surface curvature in the critical contour area.

Specification of the tolerances begins by defining three items:
a. "point of reference" is any point on the stream sheet in the critical contour area
b. "most adjacent point" is any point on a nacelle or pylon nearest to the point of reference,
c. "cross sectional area of the nacelle and pylon" ($A\pi$) is the frontal area of nacelle and pylon measured in a plane which contains the most adjacent point and is essentially perpendicular to the local stream direction.

The following tolerances can now be specified.
1. an alignment tolerance is given by the following formula, which provides an alignment tolerance value:

$$\frac{|h|}{\sqrt{\frac{A\pi}{\pi}}} < 0.2$$

where:
"h" = the distance between point of reference and most adjacent point
$A\pi$ = cross sectional area of nacelle and pylon at most adjacent point.

2. the curvature tolerance is given by the following formula which provides a curvature tolerance value:

$$\left(\frac{M}{M_\infty}\right)^2 \left(\sqrt{\frac{A\pi}{\pi}}\right) \left|\frac{1}{R_{S.S.}} - \frac{1}{R_N}\right| < 0.15$$

where:
M = Mach number on the stream sheet at the point of reference.
$M\infty$ = free stream Mach number at infinity
$R_{S.S.}$ = radius of curvature of stream sheet at point of reference.
$R_N$ radius of curvature of nacelle or pylon at most adjacent point.

Final Definition:
The radius of curvature of either the stream sheet at the point of reference or of the nacelle or pylon at the most adjacent point is measured in a plane which contains the surface normal at the point and the local velocity vector at the point.

With respect to the alignment tolerance formula given above, current analysis indicates that 0.2 would be approximately the maximum tolerance value beyond which drag penalties become excessive. Desirably, the value should be no greater than 0.15, and for best results, it should be no greater than 0.1.

With regard to the curvature tolerance formula, the maximum curvature tolerance value beyond which the drag becomes excessive is approximately 0.15. Desirably, it would be no greater than approximately 0.1. The most preferred range would be no greater than about 0.05.

It is to be understood, of course, that the tolerances given by the above formulas were derived empirically from an analysis of test data. This data indicates that if the critical contour area is designed within these tolerances, drag penalties will be brought to a practical minimum. If the critical contour area departs substantially from the tolerances given by the above formulas, the penalties in the drag become more significant, and increase would be generally in a functional relationship related to the amount of deviation from the tolerances given by the above formulas.

What is claimed:
1. In an aircraft having a longitudinal axis and designed for flight at a predetermined design speed through a main airstream having a main flow direction, a combination of an airfoil, engine and engine nacelle, said combination comprising:
   a. an airfoil having a leading edge, a trailing edge, and an upper aerodynamic surface, said airfoil having a predetermined sweep angle of at least 10°, and having an outboard end and an inboard end;
   b. a nacelle mounted near said airfoil at a location spaced above and forwardly of said airfoil, said nacelle having an upper nacelle surface and a lower nacelle surface, said lower nacelle surface comprising an inboard nacelle surface portion extending from a lower centerline of said lower surface in an inboard side line where said lower nacelle surface joins to said upper nacelle surface, and an outboard lower nacelle surface portion extending from said lower centerline to an outboard sideline where said lower nacelle surface joins to said upper nacelle surface, said lower nacelle surface being spaced upwardly and forwardly from said upper aerodynamic surface, said lower nacelle surface having a rear end positioned rearwardly of said leading edge and a forward end positioned forwardly of said leading edge;
   c. an engine mounted in said nacelle;
   d. said airfoil being characterized in that in a situation where the airfoil would be passing in flight through said airstream at the design speed, but without aerodynamic interference from other objects in proximity thereto, said airfoil would create in said airstream an airstream flow pattern having a plurality of streamlines which approach the leading edge and pass over the airfoil, with the airfoil creating in said airstream flow pattern a critical zone, which zone includes a general area in said airstream flow proximate said airfoil, where at least one of the following conditions occur:
      1. a local pressure coefficient in said airstream flow has an absolute magnitude greater than 0.05;
      2. said airstream flow about said airfoil is supersonic
   e. said nacelle having a critical surface region which comprises a one of the lower nacelle surface portions which is adjacent an airfoil portion that sweeps laterally and forwardly from the nacelle;
   f. said nacelle having a critical contour area which comprises an area where any portion of the critical surface region is within said critical zone;
   g. the critical contour area of the nacelle being in substantial contour alignment with the streamlines immediately adjacent the critical contour area to thereby reduce interference between said nacelle and said airfoil, which streamlines form a stream sheet, said critical contour area having a forward portion forward of the leading edge and sloping rearwardly in an upward direction slanted from said main flow direction in a direction of rearward sweep of said airfoil, said critical contour area having a rear portion rearward of said leading edge sloping rearwardly in a direction from said main flow direction oppositely to the direction of rearward sweep of the airfoil;

h. the upper nacelle surface and the lower nacelle surface portion which is not included in the critcal contour area being collectively a non-critical contour area, said non-critical contour area having at least a substantial portion thereof shaped to conform to configuration requirements of said engine, with at least part of the substantial portion of the non-critical contour area departing from substantial contour alignment with adjacent streamlines.

2. The combination as recited in claim 1, wherein said nacelle has an inlet end, an outlet end and a main body portion intermediate the inlet and outlet ends, said outlet end having a cross sectional area smaller than that of the main body portion, at least a portion of the non-critical contour area being arranged to slope from said main body portion rearwardly to the outlet end on a slant toward a longitudinal center line of said nacelle.

3. The combination as recited in claim 2, wherein the critical contour area is aligned in such a manner that an alignment tolerance value is no greater than 0.2, said value being given by the following formula:

$$\frac{|h|}{\sqrt{\frac{A\pi}{\pi}}} < \text{the alignment tolerance value}$$

where:
"h" = the distance between point of reference and most adjacent point,
$A\pi$ = cross sectional area of nacelle at most adjacent point,
where the following definitions apply:
a. said "point of reference" is any point on the stream sheet in the critical contour area,
b. said "most adjacent point" is any point on the nacelle nearest to the point of reference,
c. said $A\pi$ is a frontal area of the nacelle measured in a plane which contains the most adjacent point and is perpendicular to free stream direction.

4. The combination as recited in claim 3, wherein the alignment tolerance value is no greater than about 0.15.

5. The combination as recited in claim 4, wherein the alignment tolerance value is no greater than about 0.1.

6. The combination as recited in claim 2, wherein curvature of the critical contour area is such that a contour tolerance value is no greater than 0.15, said value being given by the following formula:

$$\left(\frac{M}{M_\infty}\right)^2 \left(\sqrt{\frac{A\pi}{\pi}}\right) \left|\frac{1}{R_{S.S.}} - \frac{1}{R_N}\right| < \text{Contour Tolerance Value}$$

where the following definitions apply:
M = Mach number on the stream sheet at the point of reference
$M_{oo}$ = Free stream Mach number at infinity.
$R_{S.S.}$ = Radius of curvature of stream sheet at point of reference
$R_N$ = Radius of curvature of nacelle at most adjacent point
where the following definitions apply:
a. said "point of reference" is any point on the stream sheet in the critical contour area;
b. said "most adjacent point" is any point on the nacelle nearest to the point of reference;
c. said $A\pi$ is the frontal area of the nacelle measured in a plane which contains the most adjacent point and is perpendicular to the free stream direction;
where the radius of curvature of the stream sheet at the point of reference is measured in a plane which contains the surface normal at the point of reference and a local velocity vector at the point of reference, and the radius of curvature of the nacelle at the most adjacent point is measured in a plane which contains the surface normal at the most adjacent point and a local vector at the most adjacent point.

7. The combination as recited in claim 6, wherein the curvature tolerance value is no greater than about 0.1.

8. The combination as recited in claim 7, wherein the curvature tolerance value is no greater than about 0.05.

9. The combination as recited in claim 2, wherein:
(a) the critical contour area is aligned in a manner that an alignment tolerance value is no greater than 0.2, said value being given by the following formula:

$$\frac{|h|}{\sqrt{\frac{A\pi}{\pi}}} < \text{The Alignment Tolerance Value}$$

where:
"h" = the difference between point of reference and most adjacent point;
$A\pi$ = cross sectional area of nacelle at most adjacent point,
where the following definitions apply:
a. said "point of reference" is any point on the stream sheet in the critical contour area;
b. said "most adjacent point" is any point on the nacelle nearest to the point of reference;
c. said $A\pi$ is a frontal area of the nacelle measured in a plane which contains the most adjacent point and is perpendicular to free stream direction;
(b) curvature of the critical contour area is such that a contour tolerance value is no greater than 0.15, said value being given by the following formula:

$$\left(\frac{M}{M_\infty}\right)^2 \left(\sqrt{\frac{A\pi}{\pi}}\right) \left|\frac{1}{R_{S.S.}} - \frac{1}{R_N}\right| < \text{Contour Tolerance Value}$$

where the following definitions apply:
M = Mach number on the stream sheet at the point of reference
$M_{oo}$ = free stream Mach number at infinity;
$R_{S.S.}$ = radius of curvature of stream sheet at point of reference;
$R_N$ = radius of curvature of nacelle at most adjacent point;
where the radius of curvature of the stream sheet at the point of reference is measured in a plane which contains the surface normal at the point of reference and a local velocity vector at the point of reference, and the radius of curvature of the nacelle at the most adjacent point is measured in a plane which contains the surface normal at the most adjacent point and a local vector at the most adjacent point.

10. The combination as recited in claim 9, wherein the allignment tolerance value is no greater than about 0.15, and the curvature tolerance value is no greater than about 0.1.

11. The combination as recited in claim 10, wherein the alignment tolerance is no greater than about 0.1, and the curvature tolerance is no greater than about 0.05.

12. The combination as recited in claim 1, wherein said engine comprises a turbo fan engine having a fan section and a core engine, said engine further having engine accessories located adjacent said fan section within said nacelle at a location adjacent to a part of the main body portion of the nacelle at the non-critical contour area.

13. The combination as recited in claim 1, wherein said engine comprises a turbo fan engine having a fan section and a core engine, with engine accessories adjacent said fan section, said engine accessories being located in said nacelle adjacent the forward portion of the critical contour area of the nacelle.

14. The combination as recited in claim 1, wherein there is a pylon by which said nacelle is mounted to said wing, said pylon having an inboard surface and an outboard surface, one of said surfaces being adjacent the critical contour area of said nacelle and being a pylon critical contour area, said pylon critical contour area being shaped to conform substantially to streamlines immediately adjacent to the pylon critical contour area.

15. The combination as recited in claim 14 wherein the pylon critical contour area has a forward portion forward of the airfoil leading edge which slopes rearwardly in a direction slanted in the direction of rearward sweep of the airfoil, and said pylon critical contour area has a rear portion rearward of the airfoil leading edge sloping rearwardly in a direction slanted away from the direction of rearward sweep of the airfoil.

* * * * *